United States Patent
Agarwal et al.

(10) Patent No.: US 12,481,856 B1
(45) Date of Patent: Nov. 25, 2025

(54) TRANSACTION CARD

(71) Applicant: Visa International Service Association, San Francisco, CA (US)

(72) Inventors: Ved Prakash Sajjan Kumar Agarwal, Dubai (AE); Gregory Miller, Stamford, CT (US)

(73) Assignee: Visa International Service Association, San Francisco, CA (US)

( * ) Notice: Subject to any disclaimer, the term of this patent is extended or adjusted under 35 U.S.C. 154(b) by 0 days.

(21) Appl. No.: 18/825,522

(22) Filed: Sep. 5, 2024

(51) Int. Cl.
*G06K 19/077* (2006.01)

(52) U.S. Cl.
CPC ................................ *G06K 19/0772* (2013.01)

(58) Field of Classification Search
CPC .... G06K 19/0772; G06K 19/00; G06K 19/07; G06K 19/067; G06Q 20/34
USPC .......................... 235/492, 380, 487, 488, 375
See application file for complete search history.

(56) References Cited

U.S. PATENT DOCUMENTS

| | | | | |
|---|---|---|---|---|
| 2003/0011868 | A1* | 1/2003 | Zehner | B42D 25/29 204/600 |
| 2006/0126001 | A1* | 6/2006 | Mi | B44F 1/10 349/177 |
| 2010/0026943 | A1* | 2/2010 | Jagt | G02F 1/133553 349/115 |
| 2012/0149443 | A1* | 6/2012 | Wuidart | G06K 19/07345 235/492 |
| 2014/0218663 | A1* | 8/2014 | Stahl | B42D 25/00 359/290 |
| 2022/0012556 | A1* | 1/2022 | Suh | G06K 19/0709 |
| 2022/0284252 | A1* | 9/2022 | Chu | G06K 19/07705 |

FOREIGN PATENT DOCUMENTS

| | | | | |
|---|---|---|---|---|
| AU | 2007248070 B2 * | 5/2011 | | G06Q 20/327 |
| AU | 2010350523 A1 * | 10/2012 | | H02J 50/10 |

\* cited by examiner

*Primary Examiner* — Edwyn Labaze
(74) *Attorney, Agent, or Firm* — K&L Gates LLP

(57) ABSTRACT

A transaction card includes card information, and a card face with a selectively modifiable transparency, wherein the card face is selectively switchable between a first state characterized by a first transparency and a second state characterized by a second transparency less than the first transparency, and wherein the card information is visible in the first state and obscured in the second state.

15 Claims, 11 Drawing Sheets

CARD INTERNAL VIEW

CARD INTERNAL VIEW

CARD INTERNAL VIEW MULTIPLE PDLC ARRAYS

CARD INTERNAL VIEW WITH CAPICATOR

TRANSACTION CARD

TECHNICAL FIELD

The present disclosure is directed to a transaction card with imperceptible card information.

SUMMARY

The following paragraphs provide illustrative examples of the cards, systems, and methods described in this disclosure, embodying various aspects thereof. An aspect may pertain to one or multiple elements, and any conceivable permutation of these elements is also contemplated within the scope of this disclosure.

In one aspect, the present disclosure provides a transaction card that includes card information, and a card face with a selectively modifiable transparency, wherein the card face is selectively switchable between a first state characterized by a first transparency and a second state characterized by a second transparency less than the first transparency, and wherein the card information is visible in the first state and obscured in the second state.

Additional aspects of the transaction card may include the material comprising polymer dispersed liquid crystals (PDLC), and the PDLC comprising a voltage-dependent transmittance.

Additional aspects of the transaction card may include the material being configured to define: a first segment configured to selectively obscure a first portion of the card information, and a second segment configured to selectively obscure a second portion of the card information independent of the first segment.

Additional aspects of the transaction card may include the transaction card being a batteryless card, the card face being switchable from the second state to the first state based on a threshold voltage, and/or the card face being selectively switchable between the first state and the second state based on an authentication associated with a wireless power source.

Additional aspects of the transaction card may include an integrated circuit configured to transmit current to switch the card face between the second state and the first state. The integrated circuit may include a capacitor chargeable by an external power source, wherein the capacitor is configured to switch the card face between the first state and the second state in the absence of external power.

Additional aspects of the transaction card may include the card face being selectively switchable between the first state and the second state based on an authentication associated with a wireless power source. Additionally, the authentication may be with a server associated with the wireless power source. The wireless power source may a user device, and the authentication may be with the user device.

Additional aspects of the transaction card may include the card face being defined by: a card surface that includes the card information; and an integrated circuit, comprising: a selectively transparent layer disposed on the card information; and a controller configured to permit, based on a successful authentication, current to pass through the selectively transparent layer to switch the selectively transparent layer between the first state and the second state.

In one aspect, the present disclosure provides a method for protecting card information on a card face of a transaction card. The method includes establishing, by a user device, a wireless connection with the transaction card; transmitting, by the user device, wireless power to the transaction card; receiving, by a user interface of the user device, a command to switch the card face of the transaction card between a second state and a first state; and based on the command, transmitting, by the user device, to the transaction card: authentication data; and instruction data to execute the command.

Additional aspects of the method may include retrieving the authentication data from a server for transmission to the transaction card.

In additional aspects of the method, the wireless power may charge a capacitor of the transaction card.

In additional aspects of the method, the command is to switch the card face to the first state to show card information, and the method further comprises: receiving a second command to switch the card face to the second state to obscure the card information; and transmitting, by the user device, to the transaction card, second instruction data to execute the second command.

In one aspect, the present disclosure provides a method for protecting card information on a card face of a transaction card, the method comprising: powering up an integrated circuit of the transaction card by energy from an external power source; establishing, by the integrated circuit of the transaction card, a communication channel with the external power source; receiving, by the transaction card, through the communication channel, authentication data, and instruction data from the external power source to switch the card face between a first state and a second state to reveal or obscure card information, wherein the first and second states are characterized by different light transparencies; and based on a successful authentication with the authentication data, switching, by the transaction card, the card face between a first state and a second state based on the instruction data.

In additional aspects, the method further includes charging a capacitor of the circuit of the transaction card by the energy from the external power source and/or discharging power stored in the capacitor to switch the card face between the first state and the second state in absence of the external power source. The method may include discharging power stored in the capacitor to switch the card face to the second state to obscure the card information based on a determined time.

BRIEF DESCRIPTION OF THE DRAWINGS

In the description, for purposes of explanation and not limitation, specific details are set forth, such as particular aspects, procedures, techniques, etc. to provide a thorough understanding of the present technology. However, it will be apparent to one skilled in the art that the present technology may be practiced in other aspects that depart from these specific details.

The accompanying drawings, where like reference numerals refer to identical or functionally similar elements throughout the separate views, together with the detailed description below, are incorporated in and form part of the specification, and serve to further illustrate aspects of concepts that include the claimed disclosure and explain various principles and advantages of those aspects.

Figure 1:
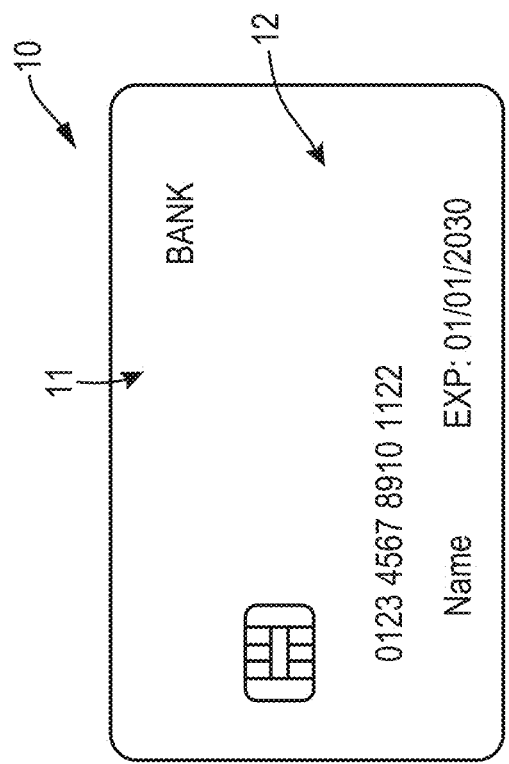
Figure 1:
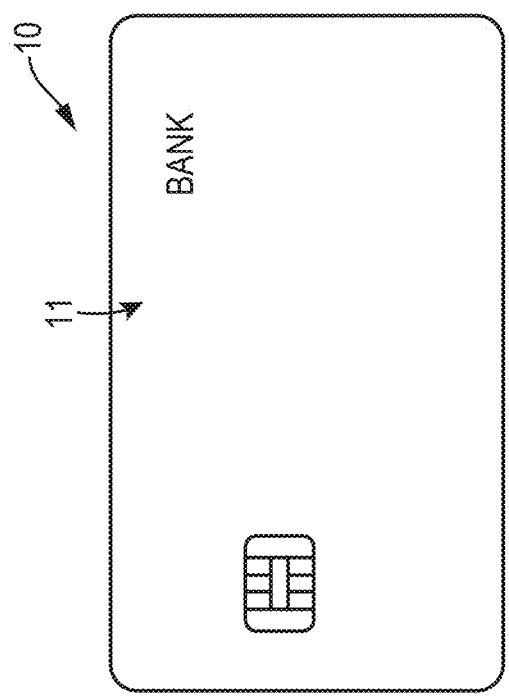

Various details of the present disclosure have been represented where appropriate by conventional symbols in the drawings, showing only those specific details that are pertinent to understanding the various aspects of the present disclosure so as not to obscure the disclosure with details that will be readily apparent to those of ordinary skill in the art having the benefit of the description herein.

FIG. 1 illustrates a transaction card, according to at least one aspect of the present disclosure.

Figure 2:
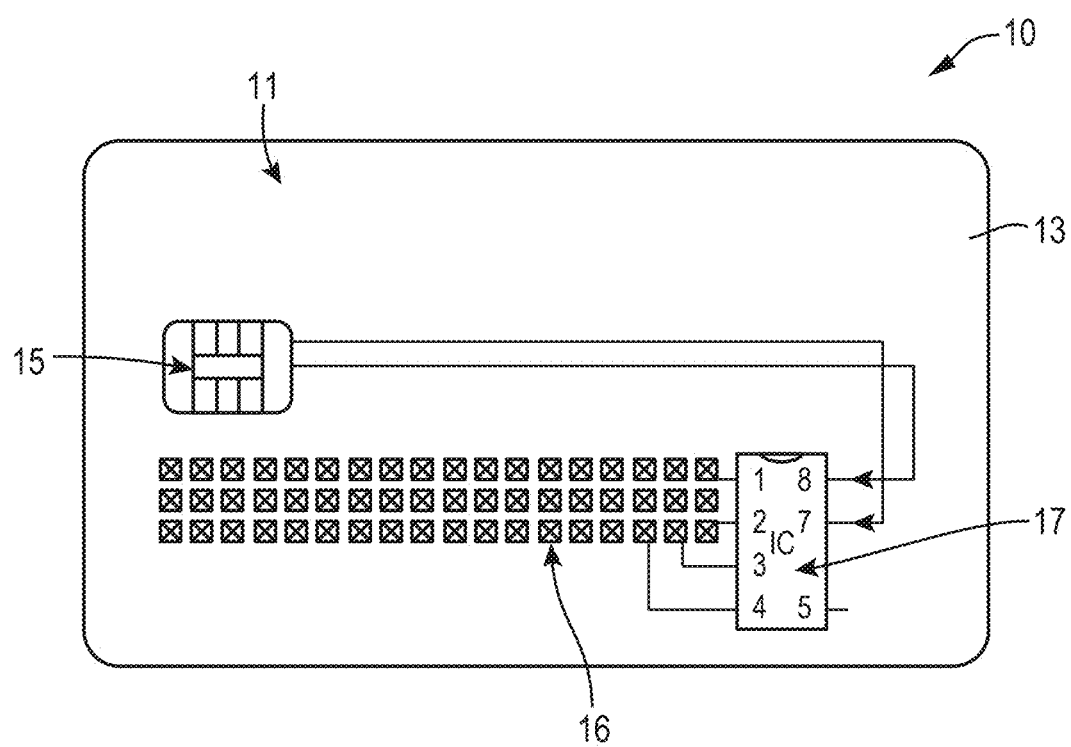

FIG. 2 illustrates components of the transaction card of FIG. 1.

Figure 3:
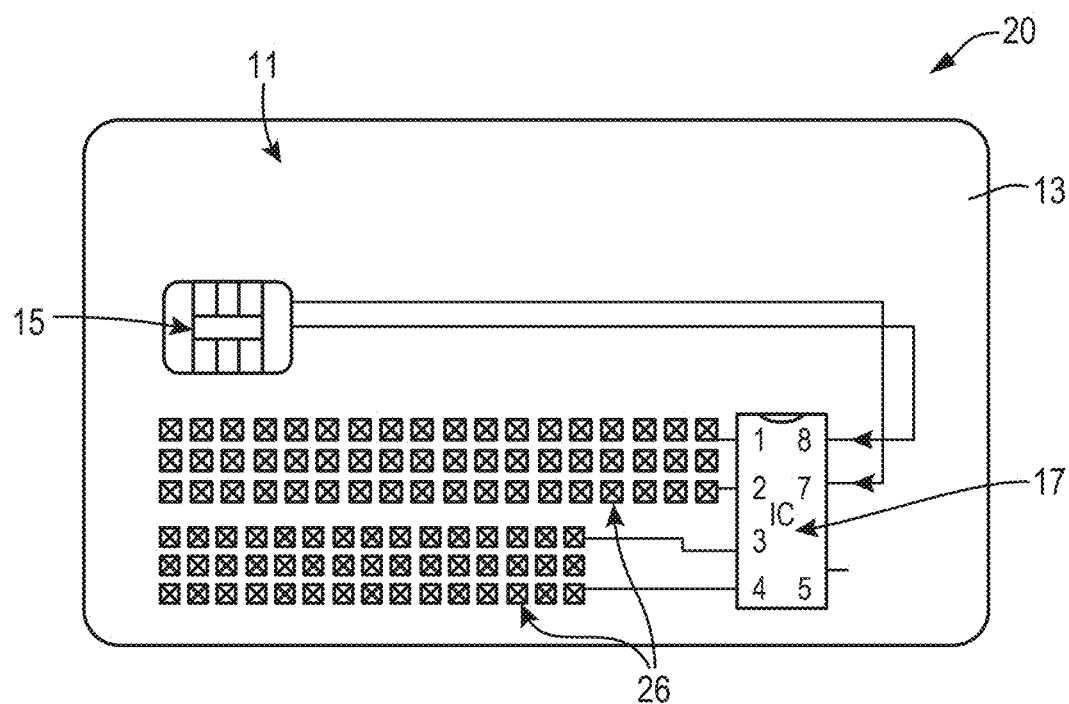

FIG. 3 illustrates a transaction card, according to at least one aspect of the present disclosure.

Figure 4:
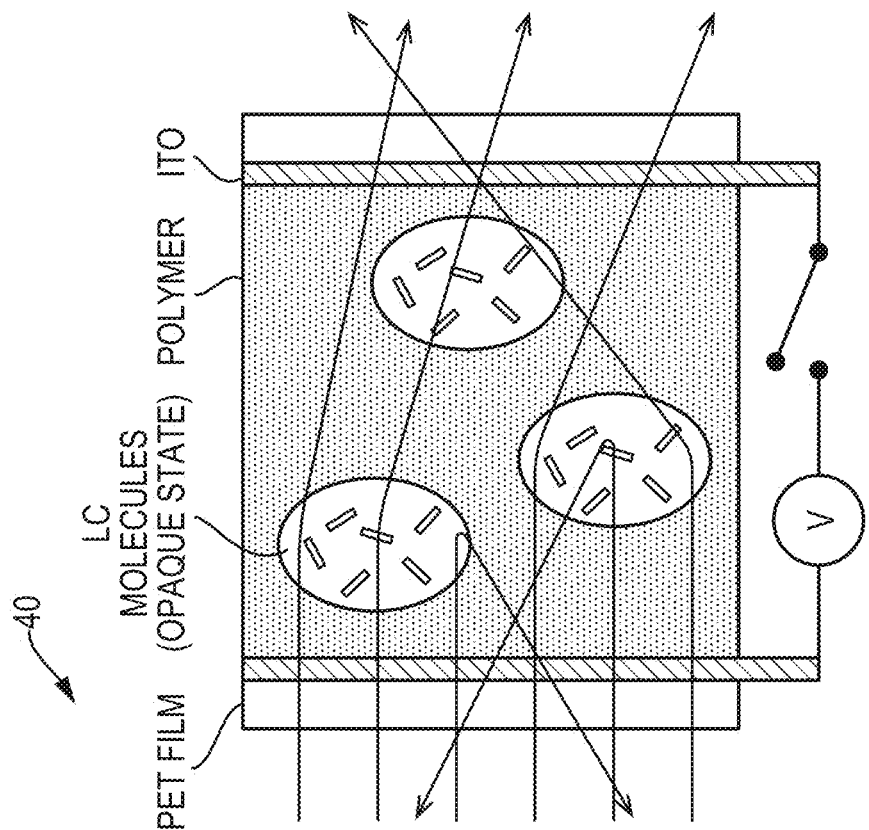
Figure 4:
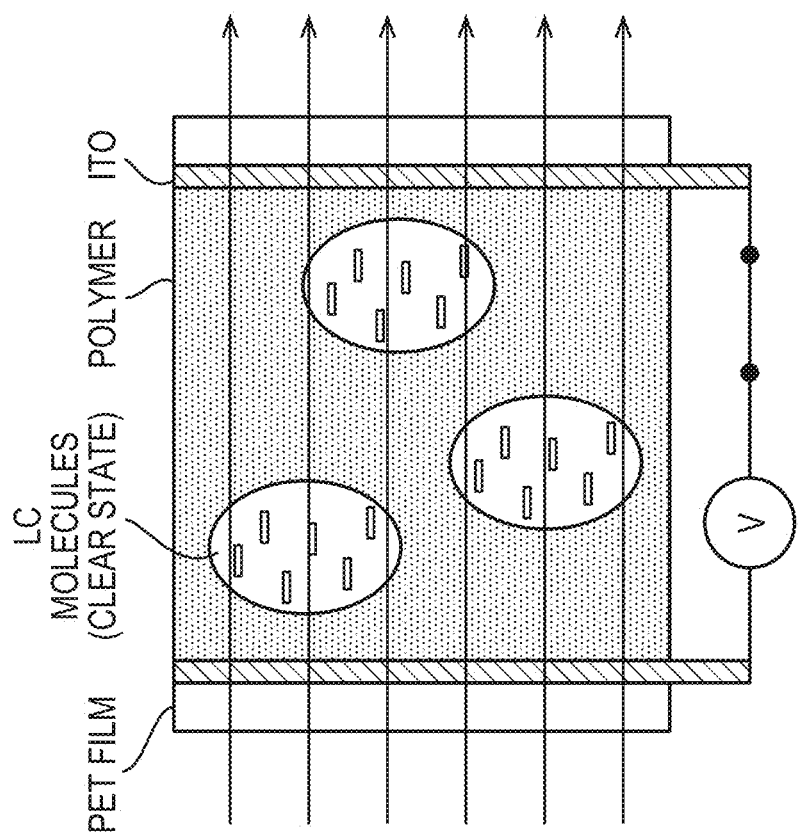

FIG. 4 illustrates a transition between first and second states associated with the transaction card of FIG. 1.

Figure 5:
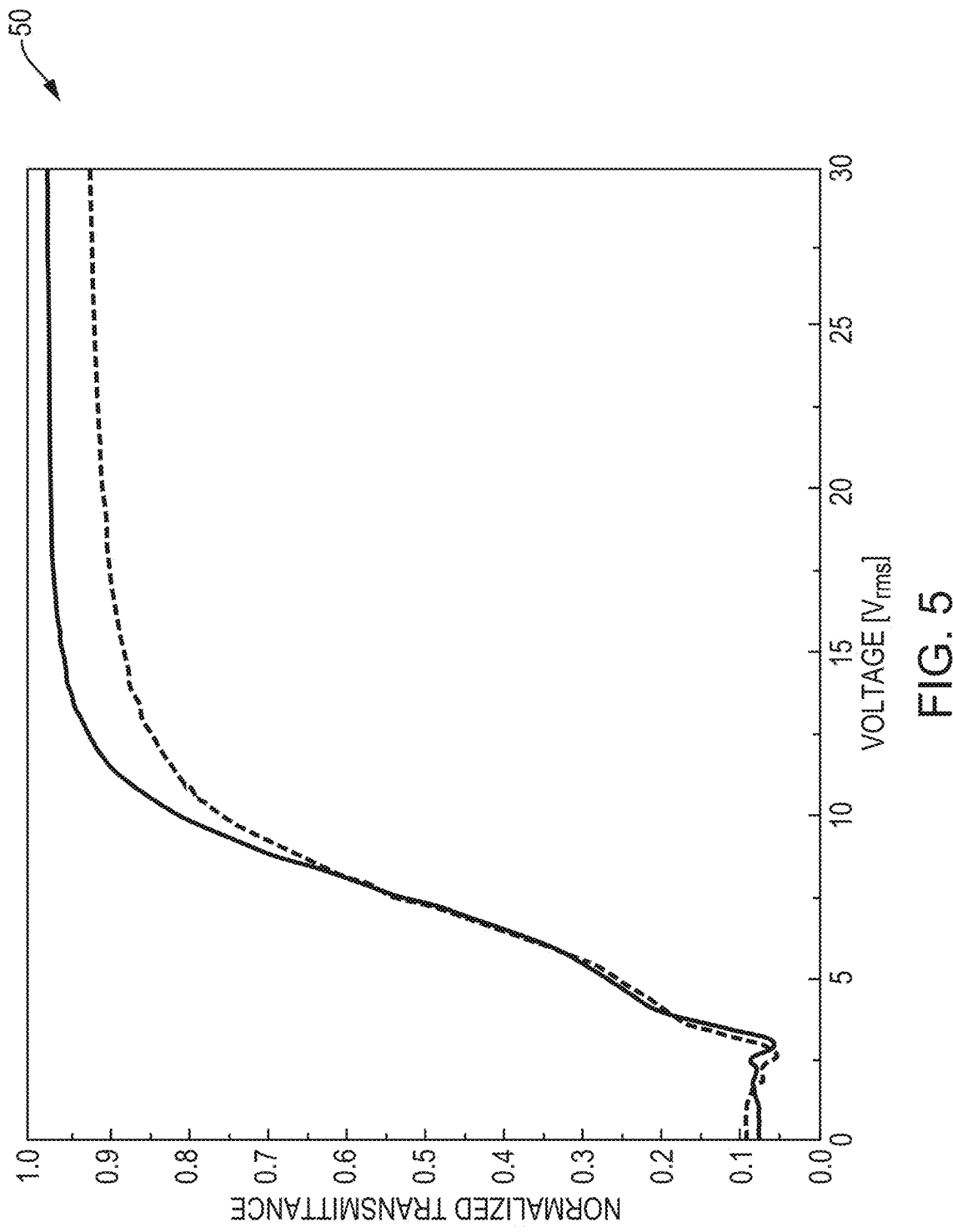

FIG. 5 is a chart representing a voltage dependent transmittance response associated with two polymers, according with at least one aspect of the present disclosure.

Figure 6:
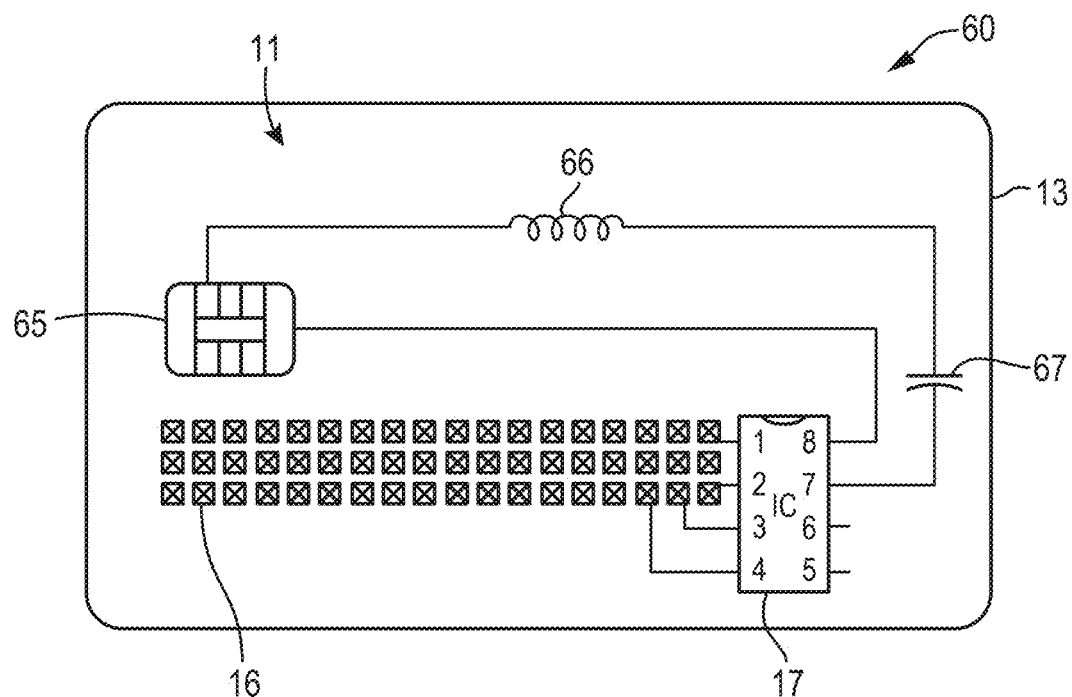

FIG. 6 illustrates a transaction card, according to at least one aspect of the present disclosure.

Figure 7:
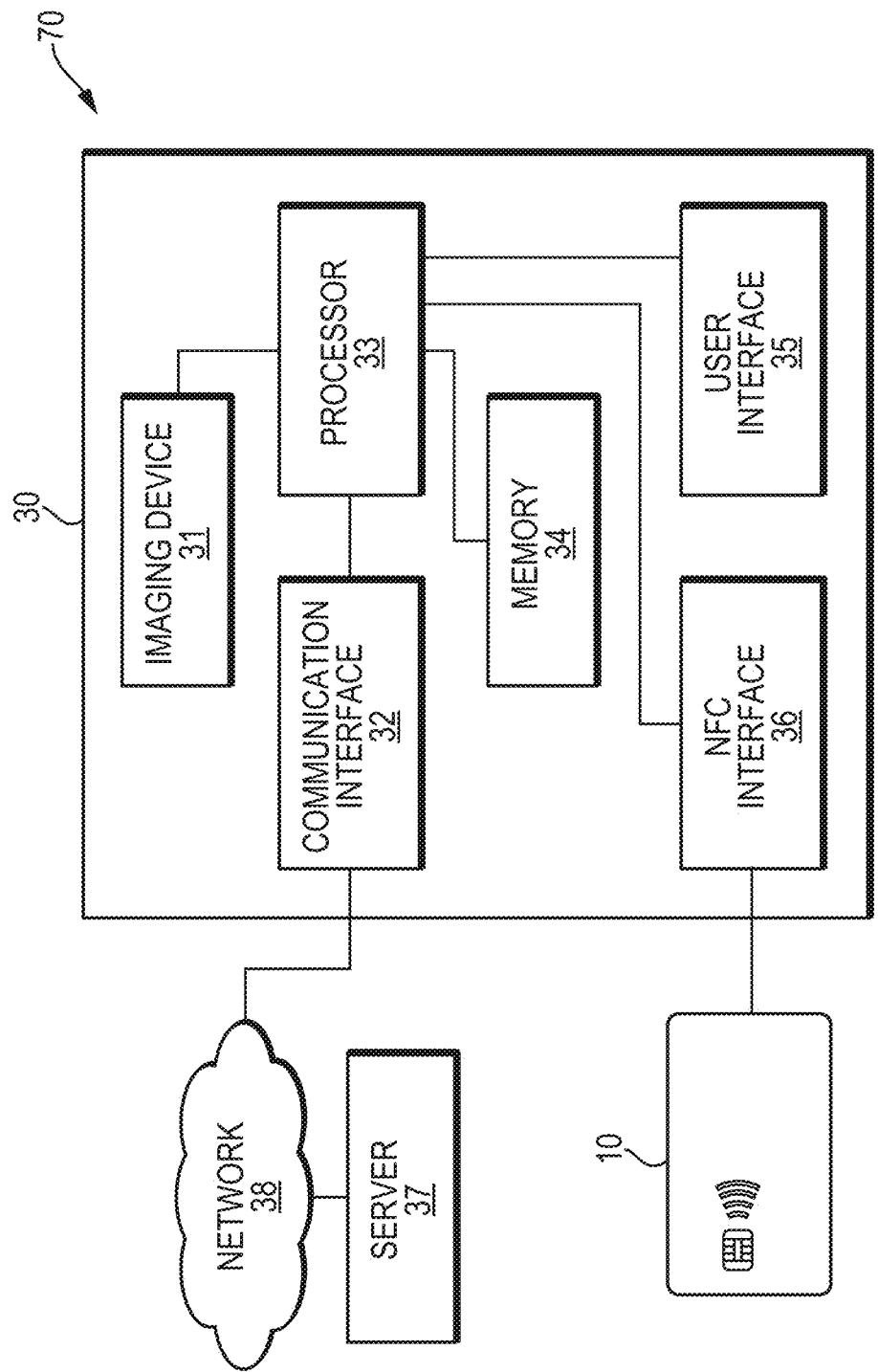

FIG. 7 illustrates a system for use with a transaction card, in accordance with at least one aspect of the present disclosure.

Figure 8:
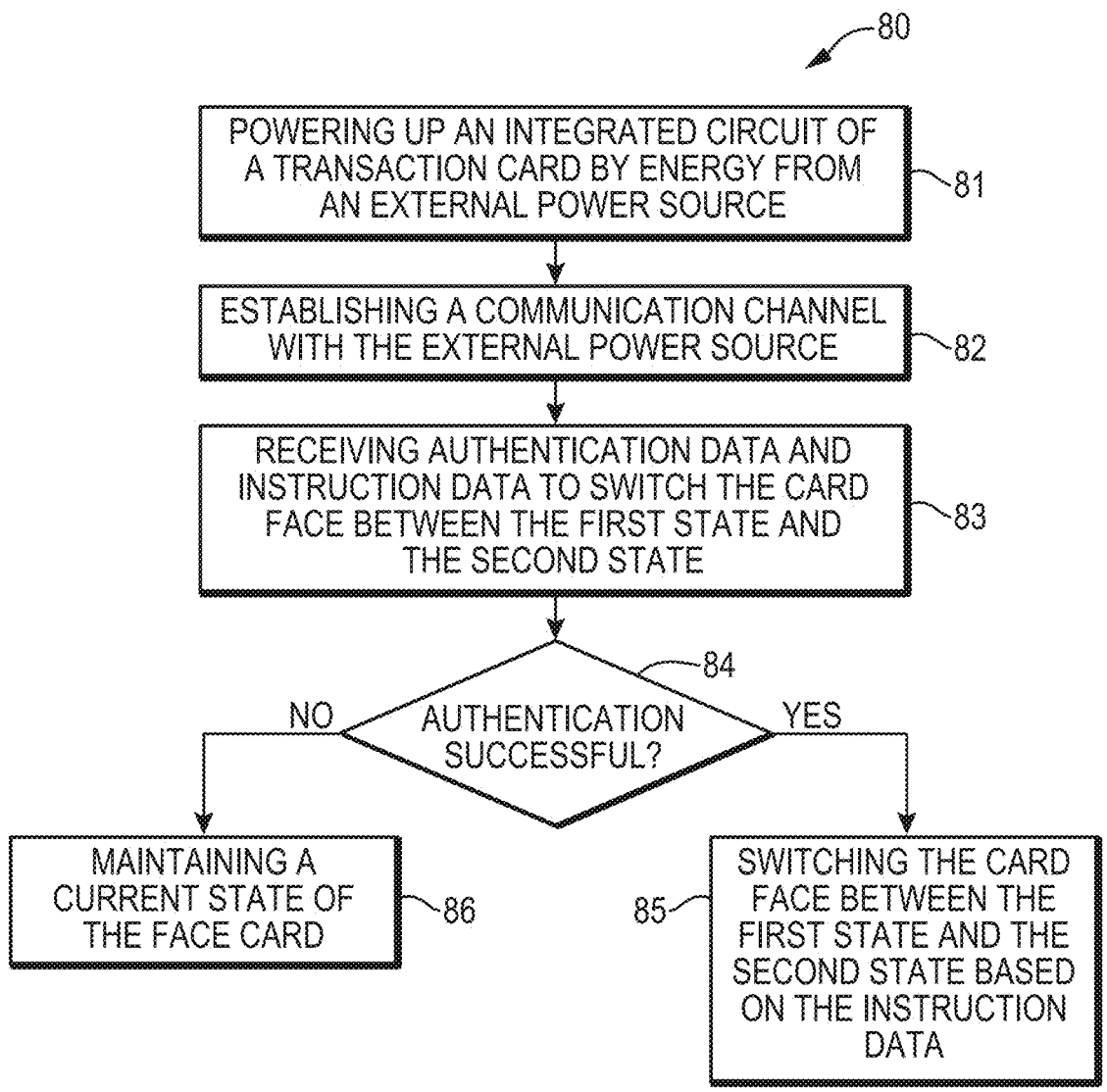
Figure 9:
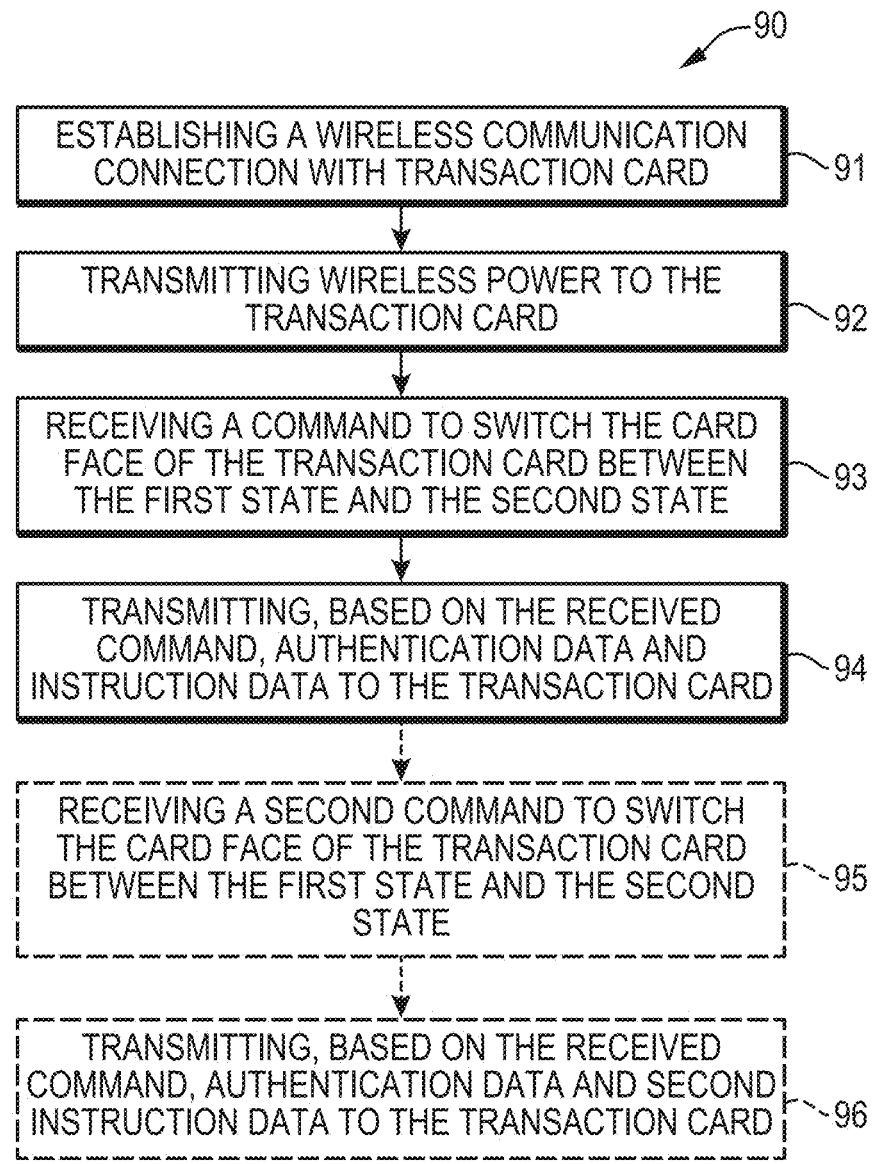

FIGS. 8 and 9 are flow diagrams illustrating methods, according to at least one aspect of the present disclosure.

Figure 10:
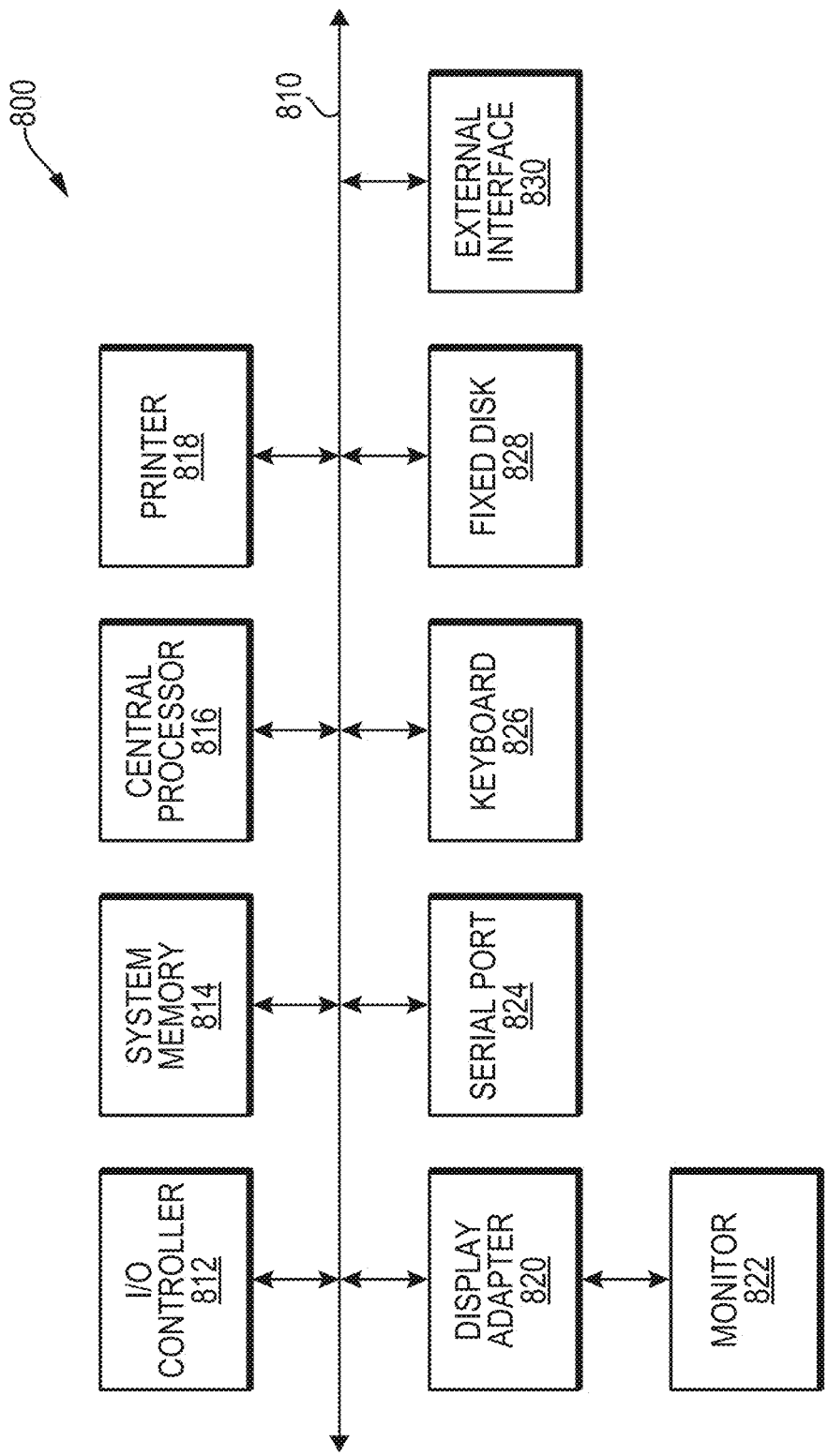

FIG. 10 is a block diagram of a computer apparatus with data processing subsystems or components, according to at least one aspect of the present disclosure.

Figure 11:
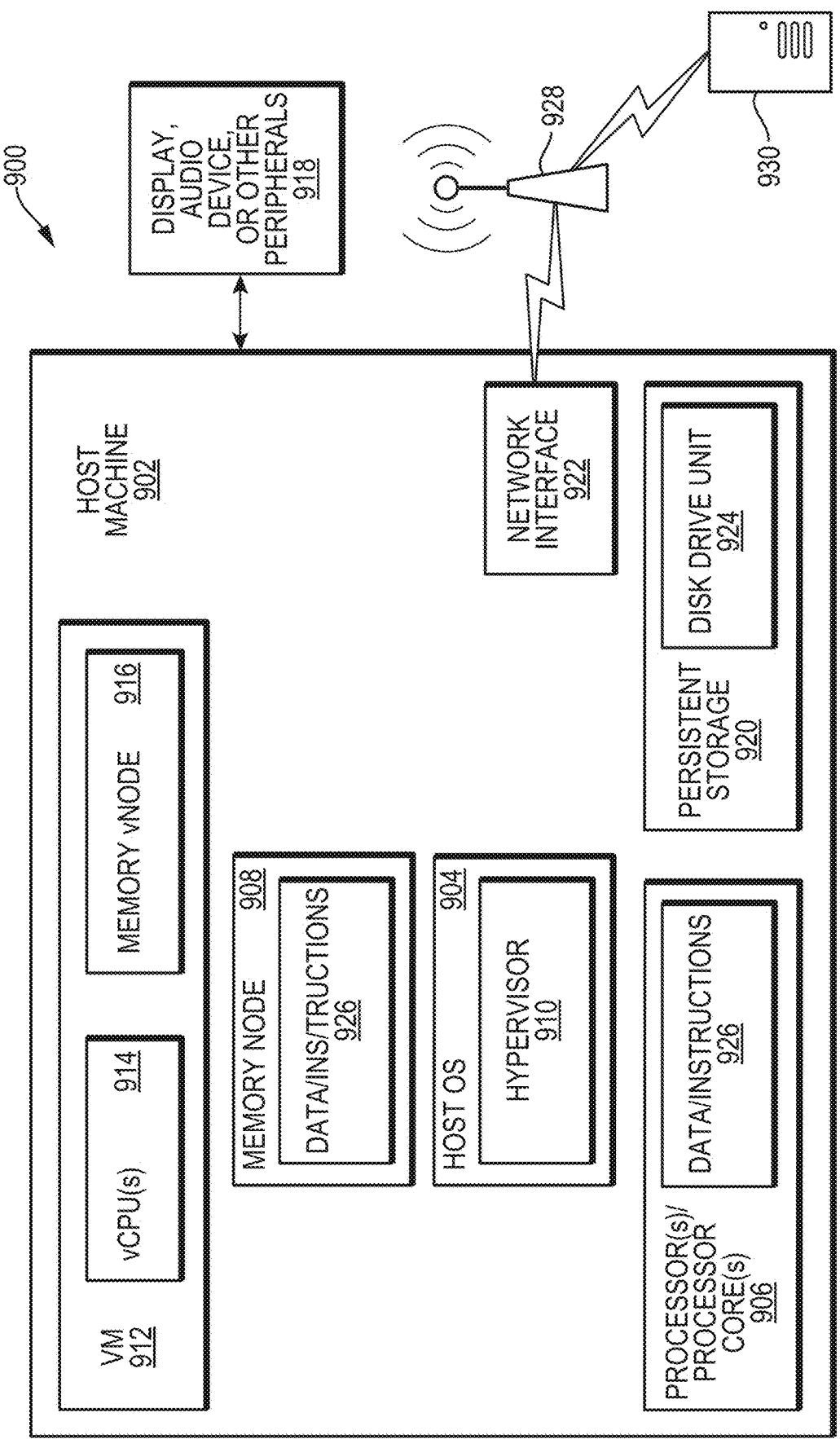

FIG. 11 is a diagrammatic representation of an example system that includes a host machine within which a set of instructions to perform any one or more of the methodologies discussed herein may be executed, according to at least one aspect of the present disclosure.

DESCRIPTION

The following disclosure may provide exemplary systems, devices, and methods for conducting a financial transaction and related activities. Although reference may be made to such financial transactions in the examples provided below, aspects are not so limited. That is, the systems, methods, and apparatuses may be utilized for any suitable purpose.

Before discussing specific embodiments, aspects, or examples, some descriptions of terms used herein are provided below.

A "credential" may be any suitable information that serves as reliable evidence of worth, ownership, identity, or authority. A credential may be a string of numbers, letters, or any other suitable characters that may be present or contained in any object or document that can serve as confirmation. Examples of credentials include value credentials, identification cards, certified documents, access cards, passcodes and other login information, etc.

"Account credentials" may include any information that identifies an account and allows a payment processor to verify that a device, person, or entity has permission to access the account. For example, account credentials may include an account identifier (e.g., a primary account number (PAN)), a token (e.g., account identifier substitute), an expiration date, a cryptogram, a verification value (e.g., card verification value (CVV)), personal information associated with an account (e.g., address, etc.), an account alias, or any combination thereof. Account credentials may be static or dynamic such that they change over time. Further, in some embodiments or aspects, the account credentials may include information that is both static and dynamic. For example, an account identifier and expiration date may be static but a cryptogram may be dynamic and change for each transaction. Further, in some embodiments or aspects, some or all of the account credentials may be stored in a secure memory of a user device. The secure memory of the user device may be configured such that the data stored in the secure memory may not be directly accessible by outside applications and a payment application associated with the secure memory may be accessed to obtain the credentials stored on the secure memory. Accordingly, a mobile application may interface with a payment application in order to gain access to payment credentials stored on the secure memory.

Further, the term "account credential," "account number," or "payment credential" may refer to any suitable information associated with an account (e.g. a payment account and/or payment device associated with the account). Such information may be directly related to the account or may be derived from information related to the account. Examples of account information may include a PAN (primary account number or "account number"), user name, expiration date, CVV (card verification value), dCVV (dynamic card verification value), CVV2 (card verification value 2), CVC3 card verification values, etc. Payment credentials may be any information that identifies or is associated with a payment account. Payment credentials may be provided in order to make a payment from a payment account. Payment credentials can also include a user name, an expiration date, a gift card number or code, and any other suitable information.

An "application" may include any software module configured to perform a specific function or functions when executed by a processor of a computer. For example, a "mobile application" may include a software module that is configured to be operated by a mobile device. Applications may be configured to perform many different functions. For instance, a "payment application" may include a software module that is configured to store and provide account credentials for a transaction. A "wallet application" may include a software module with similar functionality to a payment application that has multiple accounts provisioned or enrolled such that they are usable through the wallet application. Further, an "application" or "application program interface" (API) refers to computer code or other data sorted on a computer-readable medium that may be executed by a processor to facilitate the interaction between software components, such as a client-side front-end and/or server-side back-end for receiving data from the client. An "interface" refers to a generated display, such as one or more graphical user interfaces (GUIs) with which a user may interact, either directly or indirectly (e.g., through a keyboard, mouse, touchscreen, etc.).

"Authentication" is a process by which the credential of an endpoint (including but not limited to applications, people, devices, process, and systems) can be verified to ensure that the endpoint is who they are declared to be.

The terms "user device" refer to any electronic device that is configured to communicate with one or more servers or remote devices and/or systems. A client device or a user device may include a mobile device, a network-enabled appliance (e.g., a network-enabled television, refrigerator, thermostat, and/or the like), a computer, a POS system, and/or any other device or system capable of communicating with a network. A client device may further include a desktop computer, laptop computer, mobile computer (e.g., smartphone), a wearable computer (e.g., a watch, pair of glasses, lens, clothing, and/or the like), a cellular phone, a network-enabled appliance (e.g., a network-enabled television, refrigerator, thermostat, and/or the like), a point of sale (POS) system, and/or any other device, system, and/or software application configured to communicate with a remote device or system. In some aspects, a user device may include a mobile banking application or third party application.

As used herein, the term "communication" and "communicate" may refer to the reception, receipt, transmission, transfer, provision, and/or the like of information (e.g., data, signals, messages, instructions, calls, commands, and/or the like). A communication may use a direct or indirect connection and may be wired and/or wireless in nature. As an example, for one unit (e.g., a device, a system, a component of a device or system, combinations thereof, and/or the like) to communicate with another unit means that the one unit is able to directly or indirectly receive information from and/or transmit information to the other unit. The one unit may communicate with the other unit even though the information may be modified, processed, relayed, and/or routed between the one unit and the other unit. In one example, a first unit may communicate with a second unit even though the first unit receives information and does not communicate information to the second unit. For example, a first unit may be in communication with a second unit even though the first unit passively receives data and does not actively transmit data to the second unit. As another example, a first unit may communicate with a second unit if an intermediary unit (e.g., a third unit located between the first unit and the second unit) receives information from the first unit, processes the information received from the first unit to produce processed information, and communicates the processed information to the second unit. In some non-limiting embodiments or aspects, a message may refer to a packet (e.g., a data packet, a network packet, and/or the like) that includes data. It will be appreciated that numerous other arrangements are possible.

Reference to "a device," "a server," "a processor," and/or the like, as used herein, may refer to a previously-recited device, server, or processor that is recited as performing a previous step or function, a different server or processor, and/or a combination of servers and/or processors. For example, as used in the specification and the claims, a first server or a first processor that is recited as performing a first step or a first function may refer to the same or different server or the same or different processor recited as performing a second step or a second function.

A "digital wallet" can include an electronic device that allows an individual to conduct electronic commerce transactions. A digital wallet may be designed to streamline the purchase and payment process. A digital wallet may allow the user to load one or more payment cards onto the digital wallet so as to make a payment without having to enter an account number or present a physical card.

An "interface" may include any software module configured to process communications. For example, an interface may be configured to receive, process, and respond to a particular entity in a particular communication format. Further, a computer, device, and/or system may include any number of interfaces depending on the functionality and capabilities of the computer, device, and/or system. In some embodiments or aspects, an interface may include an application programming interface (API) or other communication format or protocol that may be provided to third parties or to a particular entity to allow for communication with a device. Additionally, an interface may be designed based on functionality, a designated entity configured to communicate with, or any other variable. For example, an interface may be configured to allow for a system to field a particular request or may be configured to allow a particular entity to communicate with the system.

An "issuer" can include a payment account issuer. The payment account (which may be associated with one or more payment devices) may refer to any suitable payment account (e.g. credit card account, a checking account, a savings account, a merchant account assigned to a consumer, or a prepaid account), an employment account, an identification account, an enrollment account (e.g. a student account), etc.

As used herein, the term "server" may include one or more computing devices which can be individual, stand-alone machines located at the same or different locations, may be owned or operated by the same or different entities, and may further be one or more clusters of distributed computers or "virtual" machines housed within a datacenter. It should be understood and appreciated by a person of skill in the art that functions performed by one "server" can be spread across multiple disparate computing devices for various reasons. As used herein, a "server" is intended to refer to all such scenarios and should not be construed or limited to one specific configuration. Further, a server as described herein may, but need not, reside at (or be operated by) a merchant, a payment network, a financial institution, a healthcare provider, a social media provider, a government agency, or agents of any of the aforementioned entities. The term "server" may also refer to or include one or more processors or computers, storage devices, or similar computer arrangements that are operated by or facilitate communication and processing for multiple parties in a network environment, such as the Internet, although it will be appreciated that communication may be facilitated over one or more public or private network environments and that various other arrangements are possible. Further, multiple computers, e.g., servers, or other computerized devices, e.g., point-of-sale devices, directly or indirectly communicating in the network environment may constitute a "system," such as a merchant's point-of-sale system. Reference to "a server" or "a processor," as used herein, may refer to a previously-recited server and/or processor that is recited as performing a previous step or function, a different server and/or processor, and/or a combination of servers and/or processors. For example, as used in the specification and the claims, a first server and/or a first processor that is recited as performing a first step or function may refer to the same or different server and/or a processor recited as performing a second step or function.

Fraudsters are becoming increasingly sophisticated, utilizing a myriad of methods to commit fraud. They exploit stolen credentials and recruit accomplices via social media, all while orchestrating phishing and social engineering attacks. For example, in a restaurant or store, during check-out, a cardholder will provide their physical card to a waiter or store clerk for processing a payment, for example. During such time, the card information can be copied or memorized, which could lead to future fraud. The tools and services designed for fraud detection and prevention are becoming more sophisticated but struggle to effectively protect readily visible card information. For example, card numbers and related information are frequently stolen using cameras at payment terminals. One possible method of thwarting card information theft is to provide a user a card with just the payment instrument (e.g., chip, magnetic stripe) and no printed card information. While this may be a helpful first step, cards without any printed information may be inconvenient for the user in some use cases and should not be the only security measure. Accordingly, there is a need for providing card information in a highly secure and convenient manner.

The present disclosure provides various implementations of transaction cards that selectively show and/or hide one or more portions of the card information. Further, various methods and systems associated with using the transaction cards are disclosed.

FIG. 1 illustrates a transaction card 10 associated with an account of a cardholder. The card 10 includes a card face 11 with card information 12. Unlike traditional cards with readily discernable card information, one or more portions of the card information 12 of the card face 11 can be selectively switched between a first state (on the right) in which the card information 12 is revealed and is readily discernible, and a second state (on the left) in which the card information 12 is obscured or hidden. The one or more portions of the card information 12, for example, an account number, a name of the cardholder, an expiration date, and/or a Card Verification Value (CCV).

The card information 12 may include of one or more portions of an account number, a name of the cardholder, an expiration date, or CCV. The remaining portions can be readily discernable on the card face 11. In one example, some digits of the account number can be readily discernable on the card face 11, while the remaining digits are selectively revealed or shown. Additionally, or alternatively, certain letters of the name can be readily discernable on the card face 11, while the remaining letters are selectively revealed or shown.

The transaction card 10 may include smart cards, debit devices (e.g., a debit card), credit devices (e.g., a credit card), stored value devices (e.g., a stored value card or "prepaid" card), magnetic stripe cards, keychain devices (such as the Speedpass™ commercially available from Exxon-Mobil Corp.), etc. The transaction card 10 may include an embedded integrated circuit 15 (FIG. 2). The integrated circuit 15 may include a data storage medium (e.g., volatile and/or non-volatile memory) to store information associated with the transaction card 10, such as an account identifier, a name of the account holder, and/or the like. The integrated circuit 15 may interface with an access device such as a point of sale device or a user device, as described in greater detail below.

In some implementations, the card face 11 includes a selectively modifiable transparency or light transmittance. In the first state, characterized by a first transparency or light transmittance, the card information is visible on the card face or unmasked. While in the second state, characterized by a second lesser transparency or lesser light transmittance, the card information is obscured or masked.

The first state may be a substantially transparent state, and the second state may be a substantially non-transparent state. In the substantially transparent state, the card information 12 is visible on the card face 11 or unmasked. While, in the substantially non-transparent state, the card information 12 is obscured or masked.

The card face 11 further includes a material with selective/modifiable transparency or selective/modifiable light transmittance. The material may be selectively disposed on one or more portions of the card information 12.

In one implementation, as illustrated in FIG. 2, the transaction card 10 includes a substrate such as a paper or plastic card, and the card information 12 is included at or near a surface 13 of the transaction card. The material can be selectively deposited on the card surface 13 on one or more portions of the card information 12.

The material may comprise one or more materials with selectively modifiable states such as, for example, voltage-based selectively modifiable states. The material may comprise one or Eelectrochromic Materials. The material may comprise on or more that selectively control light transmission therethrough. The material may include one or more polymers with selectively modifiable states. In one implementation, the material comprises liquid crystal (LC) droplets embedded in a polymer matrix, e.g., polymer dispersed liquid crystals (PDLC), disposed on the card surface 13 on one or more portions of the card information 12. The PDLC may be switched between the first state and the second state to selectively show/hide the one or more portions of the card information 12.

In FIG. 2, the material is arranged in an array 16 selectively switchable between the first and second states by a dedicated controller 17 to show/hide the card information 12. The dedicated controller 17 communicates with a chip controller of the integrated circuit 15 to receive and execute commands to switch the array 16 between the first and second states. Alternatively, in other embodiments, the array 16 may be directly controlled by the chip controller without a dedicated controller 17.

In some implementations, the material can be arranged or organized in discrete segments (e.g. arrays) that are disposed over different/separate portions of the card information that are to be separately and selectively hidden/shown, while other portions of the card information may be permanently visible (e.g., made from standard card material). For example, sensitive card information may be selectively hidden, while non-sensitive card information can be permanently visible.

FIG. 3 illustrates a transaction card 20 similar in many respects to the transaction card 10, which are not repeated herein for brevity. Like the transaction card 10, the transaction card 20 includes the card surface 11 with the card information 12, the integrated circuit 15, and the dedicated controller 17. Additionally, the transaction card 20 includes a plurality of arrays 26 (e.g., PDLC arrays) disposed onto different portions (e.g., account number, name, expiration date, and CVV) of the card information 12, which can be separately, and selectively, switched between the first and second states.

In one aspect, the plurality of arrays can be separately switched between the first and second states to selectively show one or more portions (e.g., name and expiration date) of the card information and/or hide one or more other portions of the card information (e.g., account number and CVV). As described below in greater detail, switching commands can be transmitted to the dedicated controller 17 to selectively show/hide portions of the card information 12, which provides a cardholder with the freedom to securely present selected portions of the card information 12.

In some aspects, one or more portions of the card information 12 may not be covered by the material or may be covered with a permanently transparent material to remain visible. In one implementation, one or more portions of the card information 12 are selectively obscure, one more portions are selectively shown, and/or one or more portions are permanently visible.

Further to the above, in some implementations, the integrated circuit 15 an electric field of a determined strength, for example by transmitting current (I) through the material, to switch the card face 11 between the first state and the second state. In some implementations, the card face 11 may be switchable from the first state to the second state based on a threshold voltage. The material (e.g., PDLC) may include a voltage-dependent transmittance (See FIG. 5). When a voltage threshold is met, the material is switched from the second state to the first state to show the card information.

FIG. 4 illustrates a transition 40 from the second state (on the right) with lower transparency to the first state (on the left) with higher transparency by passing current (I) through the material (e.g., PDLC). The liquid crystal molecules align, allowing incident light to pass through, which causes the card information 12 to be visible. When the electric field is removed, or reduced to a level below the determined threshold, for example, by seizing current (I) transmittance through the material, the liquid crystal molecules become randomly oriented, causing light to scatter, which causes the card information 12 to be obscured. In some implementations, the switching speed between the first and the second state is less than 0.1 seconds. The HAZE value in the first state may be 2%±0.5, achieving high transparency.

In some implementations, PDLCs can be prepared by emulsion or phase separation methods. However, the latter allows great control of the morphology, and thus the characteristics, of the final material. This method may be induced by thermal action, solvent evaporation and/or monomer polymerization. The formed LC droplets exhibit great variation depending on the method of phase separation employed. For thermally induced phase separation (TIPS), LC may be mixed with a polymer at high temperature, then the mixture may be allowed to cool at a specific rate to cause phase separation and, as the polymer hardens, the LC domains appear. For the solvent-induced phase separation (SIPS) process, both the LC and polymer may be dissolved in the same solvent. The evaporation of solvent at a specific rate induces phase separation. For the polymerization-induced phase separation (PIPS) method, the LC may be mixed with a monomer/prepolymer solution to form a homogenous solution. As the polymerization continues the polymer and LC separate from each other by liquid-liquid or liquid-gel phase separation. The LC molecules come out of the solution and form droplets that grow until polymerization is finished, i.e., when the polymer matrix becomes solid enough. The PIPS method could be further divided into thermal-initiated polymerization and ultraviolet (UV).

In some aspects, the material utilizes liquid crystals (e.g., PDLC) that maintain the first state in the presence of a voltage equal to or exceeding a determined threshold. FIG. 5 is a chart 50 illustrating light transmittance of example PDLCs based on a voltage applied to the material by the integrated circuit 15. When the voltage drops below the threshold, the liquid crystals automatically transition to the second state. In other aspects, the material utilizes bistable liquid crystals, which do not require voltage to maintain a current state (first/second state), but only requires the voltage to transition between the states. Accordingly, when the voltage drops below a threshold voltage, needed for the transition, the liquid crystals maintain the current state (first/second state).

FIG. 6 illustrates a transaction card 60 similar in many respects to the transaction cards 10, 20, which are not repeated herein for brevity. Like the transaction cards 10, 20, the transaction card 60 includes the card surface 11 with the card information 12, the dedicated controller 17, and the array 16, or alternatively the plurality of arrays 26. Additionally, the transaction card 60 includes an integrated circuit 65 and an NFC coil 66 for wireless power transmission and/or wireless communication. The NFC coil 66 can be equally utilized with the transaction cards 10, 20 with the integrated circuit 15 for wireless power transmission and/or wireless communication.

Further, the integrated circuit 65 may include a capacitor 67 chargeable by an external power source, for example by wireless power received through the NFC coil 66. The capacitor 67 may then provide power for switching the card face 11 between the first state and the second state in the absence of the external power. Accordingly, the capacitor 67 provides a temporary internal power source capable of switching the transaction card 60 between the first state and the second state. The capacitor 67 may be equally utilized with the transaction cards 10, 20 with the integrated circuit 15 as a temporary internal power source for switching between the first and second states.

In some aspects, when the charge stored by the capacitor 67 falls below a charge level sufficient to maintain the first state, the material automatically switches to the second state. Accordingly, the material may temporarily hold the first state, with the higher transparency, without external power until the charge level falls below a determined charge level. Alternatively, in instances where the material comprises bistable liquid crystals, when the charge stored by the capacitor 67 falls below a charge level sufficient to switch the material between the first and second states, the material maintains its last/current state.

In some implementations, the chip controller of the integrated circuit 15, 65 or the dedicated controller 17 comprises a time element. The chip controller of the integrated circuit 15, 65 or the dedicated controller 17 may cause a switch from the first state to the second state based on a determined time measured, or tracked, by the time element. In one implementation, the loss of external power triggers the time element to run to the determined time. In other instances, the transition from the second state to the first state to show the card information 12 triggers the time element to run to the determined time. When the determined time is reached, the chip controller of the integrated circuit 15, 65 or the dedicated controller 17 transitions the material to the second state, to ensure that the card information remain obscured. The determined time may be based on the charge stored by the capacitor 67 and/or the strength of the electric field necessary to transition the material between the first and second states.

FIG. 7 illustrates a system 70 for use with any of the transaction cards 10, 20, 60, in accordance with at least one aspect of the present disclosure. The system 70 includes a wireless power source such as, for example, a user device 30 configured to communicate with an issuer server 37 through a network 38. The user device 30 may include a communication interface 32, a user interface 35, a processor 33, and a memory 34. The processor 33 may execute program instructions stored in the memory 34. The program instructions may be defined by one or more steps of one or more methods described herein. The user device 30 may further include an NFC interface 36 for wireless communication with one or more of the cards 10, 20, 60.

The user device 30 may include an issuer application that communicates with the issuer server 37 and facilitates an interaction between a user, e.g., cardholder, of the user device 30 and a transaction card (e.g., transaction cards 10, 20, 60). In some implementations, the transaction card, using program instructions executable by a controller (e.g., chip controller of the integrated circuit 15, 65 or the dedicated controller 17), may condition switching the card face 11 between the first state and the second state based on completing a successful authentication. The issuer application on the user device 30 may coordinate the authentication process using authentication data stored locally in the memory 34 or retrieved from the issuer server 37, for example.

The chip controller of the integrated circuit 15, 65 may permit a switch between the first state and the second state if a successful authentication is achieved. The switch may be triggered by an input into the user interface 35 of the user device 30, for example.

The present disclosure further provides various implementations of methods and systems for protecting card information on a card face of a transaction card (e.g., transaction card 10, 20, 60). In one implementation, as illustrated in FIG. 8, a method 80 includes powering up 81 an integrated circuit (e.g., integrated circuit 15, 65) of the transaction card by energy from an external power source (e.g., user device 30). The method 80 further includes establishing 82, by the integrated circuit, a communication channel with the external power source. In some implementations, the transaction card utilizes resonant inductive coupling for communication and/or power transfer. In one embodiment, the transaction card includes a built-in inductor, e.g., NFC coil 66, for wireless communication with and/or power transfer from NFC interface 36 of the user device 30.

The method 80 further includes receiving 83, by the transaction card, through the communication channel, authentication data, and instruction data from the external power source to switch the card face 11 between the first state and the second state to reveal or obscure card information 12. The instruction data may be based on a command received by the external power source to obscure or reveal the card information 12, as described in greater detail below. The authentication data may include a cryptographic key (e.g., a symmetric key, a public or private key of an asymmetric key pair) an encryption algorithm (e.g., a triple data encryption standard (Triple DES) algorithm, an advanced encryption standard (AES) algorithm).

The method 80 further includes determining 84 whether the authentication is successful and switching 85 the card face 11 between a first state and a second state based on the instruction data if the authentication is successful or, if not successful, maintaining 86 a current state of the card face 11 and, optionally, communicating a message to the external power source indicating a failure to authenticate.

In some implementations, the integrated circuit of the transaction card includes a capacitor 67, and the method 80 further includes charging the capacitor 67 by the external power source. In one implementation, the method 80 further includes discharging power stored by the capacitor 67 to switch the card face 11 between the first state and the second state in absence of external power source, which can be performed based on a determined time, as discussed above.

FIG. 9 illustrates a method 90 that may be executed by external power source (e.g., user device 30) to switch the transaction card between the first and second states based on input commands. The method 90 includes establishing 91, by the user device, a wireless connection with the transaction card, and transmitting 92 wireless power to the transaction card.

In one implementation, the wireless power charges the capacitor 67. The method further includes receiving 93 a command to switch the card face of the transaction card between the first state and the second state. For example, a cardholder may input the command through the user interface 36, while holding the transaction card within close proximity to the user device 30. Alternatively, the cardholder may input the command into an application associated with the card and, then, position the transaction card within sufficient proximity to the user device 30 for power and/or communication signal transmission.

The method 90 further includes transmitting 94, by the user device 30, based on the received command, authentication data and instruction data to the transaction card. In some implementations, the user device 30 retrieves the authentication data from the issuer server 37 for transmission to the transaction card. In other implementations, the user device 30 generates the authentication data for transmission to the transaction card.

In some implementations, the instruction data is indicative of a first command to show the card information 12 on the card face 11, and the method further includes receiving 95 a second command to obscure the card information 12, and transmitting 96, by the user device 30, to the transaction card, second instruction data to execute the second command.

Components of the system 70 can be implemented in software, hardware, and/or combinations thereof. Such components may include, or make use of, one or more computer apparatuses, computer systems, or the like. Each of these computer apparatuses, computer servers, computer systems, or the like are described in greater detail below with respect to the computer apparatus 800 shown in FIG. 10 and computer system 900 shown in FIG. 11.

FIG. 10 is a block diagram of a computer apparatus 800 with data processing subsystems or components, according to at least one aspect of the present disclosure. The subsystems shown in FIG. 10 are interconnected via a system bus 810. Additional subsystems such as a printer 818, keyboard 826, fixed disk 828 (or other memory comprising computer-readable media), monitor 822 (which is coupled to a display adapter 820), and others are shown. Peripherals and input/output (I/O) devices, which couple to an I/O controller 812 (which can be a processor or other suitable controller), can be connected to the computer system by any number of means known in the art, such as a serial port 824. For example, the serial port 824 or external interface 830 can be used to connect the computer apparatus 800 to a wide area network such as the Internet, a mouse input device, or a scanner. The interconnection via system bus 810 allows the central processor 816 to communicate with each subsystem and to control the execution of instructions from system memory 814 or the fixed disk 828, as well as the exchange of information between subsystems. The system memory 814 and/or the fixed disk 828 may embody a computer-readable medium.

FIG. 11 is a diagrammatic representation of an example system 900 that includes a host machine 902 within which a set of instructions to perform any one or more of the methodologies discussed herein may be executed, according to at least one aspect of the present disclosure. In various aspects, the host machine 902 operates as a stand-alone device or may be connected (e.g., networked) to other machines. In a networked deployment, the host machine 902 may operate in the capacity of a server or a client machine in a server-client network environment, or as a peer machine in a peer-to-peer (or distributed) network environment. The host machine 902 may be a computer or computing device, a personal computer (PC); a tablet PC; a set-top box; a personal digital assistant; a cellular telephone; a portable music player (e.g., a portable hard drive audio device, such as an Moving Picture Experts Group Audio Layer 3 (MP3) player); a web appliance; a network router, switch, or bridge; or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example system 900 includes the host machine 902, running a host operating system (OS) 904 on a processor or multiple processor(s)/processor core(s) 906 (e.g., a central processing unit (CPU), a graphics processing unit, or both), and various memory nodes 908. The host OS 904 may include a hypervisor 910, which is able to control the functions and/or communicate with a virtual machine (VM) 912 running on machine-readable media. The VM 912 also may include a virtual CPU or vCPU 914. The memory nodes 908 may be linked or pinned to virtual memory nodes or vNodes 916. When the memory node 908 is linked or pinned to a corresponding vNode 916, then data may be mapped directly from the memory nodes 908 to their corresponding vNodes 916.

All the various components shown in host machine 902 may be connected with and to each other or communicate to each other via a bus (not shown) or via other coupling or communication channels or mechanisms. The host machine 902 may further include a video display, audio device, or other peripherals 918 (e.g., a liquid crystal display; alphanumeric input device(s) including, e.g., a keyboard; a cursor control device, e.g., a mouse; a voice recognition or biometric verification unit; an external drive; a signal generation device, e.g., a speaker); a persistent storage device 920 (also referred to as disk drive unit); and a network interface device 922. The host machine 902 may further include a data encryption module (not shown) to encrypt data. The components provided in the host machine 902 are those typically found in computer systems that may be suitable for use with aspects of the present disclosure and are intended to represent a broad category of such computer components that are known in the art. Thus, the system 900 can be a server, minicomputer, mainframe computer, or any other computer system. The computer may also include different bus configurations, networked platforms, multi-processor platforms, and the like. Various OSs may be used, including UNIX, LINUX, WINDOWS, QNX ANDROID, IOS, CHROME, TIZEN, and other suitable OSs.

The disk drive unit 924 also may be a solid-state drive, a hard disk drive, or other drive that includes a computer or machine-readable medium on which is stored one or more sets of instructions and data structures (e.g., data/instructions 926) embodying or utilizing any one or more of the methodologies or functions described herein. The data/instructions 926 also may reside, completely or at least partially, within the main memory node 908 and/or within the processor(s) 906 during execution thereof by the host machine 902. The data/instructions 926 may further be transmitted or received over a network 928 via the network interface device 922 utilizing any one of several well-known transfer protocols (e.g., Hyper Text Transfer Protocol (HTTP)).

The processor(s) 906 and memory nodes 908 also may comprise machine-readable media. The term "computer-readable medium" or "machine-readable medium" should be taken to include a single medium or multiple medium (e.g., a centralized or distributed database and/or associated caches and servers) that store the one or more sets of instructions. The term "computer-readable medium" shall also be taken to include any medium that is capable of storing, encoding, or carrying a set of instructions for execution by the host machine 902 and that causes the host machine 902 to perform any one or more of the methodologies of the present application or that is capable of storing, encoding, or carrying data structures utilized by or associated with such a set of instructions. The term "computer-readable medium" shall accordingly be taken to include, but not be limited to, solid-state memories, optical and magnetic media, and carrier wave signals. Such media may also include, without limitation, hard disks, floppy disks, flash memory cards, digital video disks, random access memory (RAM), read-only memory (ROM), and the like. The example aspects described herein may be implemented in an operating environment comprising software installed on a computer, in hardware, or in a combination of software and hardware.

One skilled in the art will recognize that Internet service may be configured to provide Internet access to one or more computing devices that are coupled to the Internet service and that the computing devices may include one or more processors, buses, memory devices, display devices, I/O devices, and the like. Furthermore, those skilled in the art may appreciate that the Internet service may be coupled to one or more databases, repositories, servers, and the like, which may be utilized to implement any of the various aspects of the disclosure as described herein.

The computer program instructions also may be loaded onto a computer, a server, other programmable data processing apparatus, or other devices to cause a series of operational steps to be performed on the computer, other programmable apparatus, or other devices to produce a computer-implemented process such that the instructions that execute on the computer or other programmable apparatus provide processes for implementing the functions/acts specified in the flowchart and/or block diagram block or blocks.

Suitable networks may include or interface with any one or more of, for instance, a local intranet; a personal area network (PAN); a local area network (LAN); a wide area network (WAN); a metropolitan area network (MAN); a virtual private network (VPN); a storage area network (SAN); a frame relay connection; an advanced intelligent network (AIN) connection; a synchronous optical network (SONET) connection; a digital T1, T3, E1, or E3 line; a digital data service (DDS) connection; a digital subscriber line (DSL) connection; an Ethernet connection; an integrated services digital network (ISDN) line; a dial-up port, such as a V.90, V.34, or V.34bis analog modem connection; a cable modem; an Asynchronous Transfer Mode (ATM) connection; or an Fiber Distributed Data Interface (FDDI) or Copper Distributed Data Interface (CDDI) connection. Furthermore, communications may also include links to any of a variety of wireless networks, including Wireless Application Protocol (WAP), General Packet Radio Service (GPRS), Global System for Mobile Communication (GSM), Code Division Multiple Access (CDMA) or Time Division Multiple Access (TDMA), cellular phone networks, global positioning system (GPS), cellular digital packet data (CDPD), Research in Motion, Limited (RIM) duplex paging network, Bluetooth radio, or an Institute of Electrical and Electronics Engineers (IEEE) 802.11-based radio frequency (RF) network. The network 4028 can further include or interface with any one or more of an RS-232 serial connection, an IEEE-1394 (Firewire) connection, a Fiber Channel connection, an IrDA (infrared (IR)) port, a Small Computer Systems Interface (SCSI) connection, a Universal Serial Bus (USB) connection or other wired or wireless, digital, or analog interface or connection, mesh, or Digi® networking.

In general, a cloud-based computing environment is a resource that typically combines the computational power of a large grouping of processors (such as within web servers) and/or that combines the storage capacity of a large grouping of computer memories or storage devices. Systems that provide cloud-based resources may be utilized exclusively by their owners or such systems may be accessible to outside users who deploy applications within the computing infrastructure to obtain the benefit of large computational or storage resources.

The cloud is formed, for example, by a network of web servers that comprise a plurality of computing devices, such as the host machine 902, with each server 930 (or at least a plurality thereof) providing processor and/or storage resources. These servers manage workloads provided by multiple users (e.g., cloud resource customers or other users). Typically, each user places workload demands upon the cloud that vary in real-time, sometimes dramatically. The nature and extent of these variations typically depends on the type of business associated with the user.

It is noteworthy that any hardware platform suitable for performing the processing described herein is suitable for use with the technology. The terms "computer-readable storage medium" and "computer-readable storage media" as used herein refer to any medium or media that participate in providing instructions to a CPU for execution. Such media can take many forms, including, but not limited to, non-volatile media, volatile media, and transmission media. Non-volatile media include, for example, optical or magnetic disks, such as a fixed disk. Volatile media include dynamic memory, such as system RAM. Transmission media include coaxial cables, copper wire and fiber optics, among others, including the wires that comprise one aspect of a bus. Transmission media can also take the form of acoustic or light waves, such as those generated during RF and IR data communications. Common forms of computer-readable media include, for example, a flexible disk, a hard disk, magnetic tape, any other magnetic medium, a compact disc ROM (CD-ROM) disk, digital video disc, any other optical medium, any other physical medium with patterns of marks or holes, a RAM, a programmable ROM, an erasable programmable ROM (EPROM), an electrically erasable programmable ROM (EEPROM), a FLASH EPROM, any other memory chip or data exchange adapter, a carrier wave, or any other medium from which a computer can read.

Various forms of computer-readable media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU.

Computer program code for carrying out operations for aspects of the present technology may be written in any combination of one or more programming languages, including an object-oriented programming language such as Java, Smalltalk, C++, or the like and conventional procedural programming languages, such as the "C" programming language, Go, Python, or other programming languages, including assembly languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a LAN or a WAN, or the connection may be made to an external computer (for example, through the Internet using an Internet service provider).

The foregoing detailed description has set forth various forms of the systems and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, and/or examples can be implemented, individually and/or collectively, by a wide range of hardware, software, firmware, or virtually any combination thereof. Those skilled in the art will recognize that some aspects of the forms disclosed herein, in whole or in part, can be equivalently implemented in integrated circuits as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skilled in the art in light of this disclosure. In addition, those skilled in the art will appreciate that the mechanisms of the subject matter described herein are capable of being distributed as one or more program products in a variety of forms, and an illustrative form of the subject matter described herein applies regardless of the particular type of signal-bearing medium used to actually carry out the distribution.

Instructions used to program logic to perform various disclosed aspects can be stored within a memory in the system, such as dynamic RAM, cache, flash memory, or other storage. Furthermore, the instructions can be distributed via a network or by way of other computer-readable media. Thus a machine-readable medium may include any mechanism for storing or transmitting information in a form readable by a machine (e.g., a computer), including, but not limited to, floppy diskettes, optical disks, CD-ROMs, magneto-optical disks, ROM, RAM, EPROM, EEPROM, magnetic or optical cards, flash memory, or a tangible, machine-readable storage used in the transmission of information over the Internet via electrical, optical, acoustical, or other forms of propagated signals (e.g., carrier waves, IR signals, digital signals). Accordingly, the non-transitory computer-readable medium includes any type of tangible machine-readable medium suitable for storing or transmitting electronic instructions or information in a form readable by a machine (e.g., a computer).

Any of the software components or functions described in this application may be implemented as software code to be executed by a processor using any suitable computer language, such as, for example, Python, Java, C++, or Perl, using, for example, conventional or object-oriented techniques. The software code may be stored as a series of instructions or commands on a computer-readable medium, such as RAM, ROM, a magnetic medium such as a hard drive or a floppy disk, or an optical medium such as a CD-ROM. Any such computer-readable medium may reside on or within a single computational apparatus and may be present on or within different computational apparatuses within a system or network.

As used in any aspect herein, the term "logic" may refer to an app, software, firmware, and/or circuitry configured to perform any of the aforementioned operations. Software may be embodied as a software package, code, instructions, instruction sets, and/or data recorded on a non-transitory computer-readable storage medium. Firmware may be embodied as code, instructions, instruction sets, and/or data that are hard-coded (e.g., non-volatile) in memory devices.

As used in any aspect herein, the terms "component," "system," "module," and the like can refer to a computer-related entity, either hardware, a combination of hardware and software, software, or software in execution.

As used in any aspect herein, an "algorithm" refers to a self-consistent sequence of steps leading to a desired result, where a "step" refers to a manipulation of physical quantities and/or logic states that may, though need not necessarily, take the form of electrical or magnetic signals capable of being stored, transferred, combined, compared, and otherwise manipulated. It is common usage to refer to these signals as bits, values, elements, symbols, characters, terms, numbers, or the like. These and similar terms may be associated with the appropriate physical quantities and are merely convenient labels applied to these quantities and/or states.

A network may include a packet-switched network. The communication devices may be capable of communicating with each other using a selected packet-switched network communications protocol. One example communications protocol may include an Ethernet communications protocol, which may be capable of permitting communication using a Transmission Control Protocol/Internet Protocol. The Ethernet protocol may comply or be compatible with the Ethernet standard published by the IEEE titled "IEEE 802.3 Standard," published in December 2008 and/or later versions of this standard. Alternatively, or additionally, the communication devices may be capable of communicating with each other using an X.25 communications protocol. The X.25 communications protocol may comply or be compatible with a standard promulgated by the International Telecommunication Union-Telecommunication Standardization Sector. Alternatively, or additionally, the communication devices may be capable of communicating with each other using a frame relay communications protocol. The frame relay communications protocol may comply or be compatible with a standard promulgated by Consultative Committee for International Telegraph and Telephone and/or the American National Standards Institute. Alternatively, or additionally, the transceivers may be capable of communicating with each other using the ATM communications protocol. The ATM communications protocol may comply or be compatible with an ATM standard published by the ATM Forum titled "ATM-MPLS Network Interworking 2.0," published August 2001, and/or later versions of this standard. Of course, different and/or after-developed connection-oriented network communication protocols are equally contemplated herein.

Unless specifically stated otherwise as apparent from the foregoing disclosure, it is appreciated that, throughout the present disclosure, discussions using terms such as "processing," "computing," "calculating," "determining," "displaying," or the like refer to the action and processes of a computer system, or similar electronic computing device, that manipulates and transforms data represented as physical (electronic) quantities within the computer system's registers and memories into other data similarly represented as physical quantities within the computer system memories, registers, or other such information storage, transmission, or display devices.

One or more components may be referred to herein as "configured to," "configurable to," "operable/operative to," "adapted/adaptable," "able to," "conformable/conformed to," etc. Those skilled in the art will recognize that "configured to" can generally encompass active-state components, inactive-state components, and/or standby-state components, unless context requires otherwise.

Those skilled in the art will recognize that, in general, terms used herein, and especially in the appended claims (e.g., bodies of the appended claims) are generally intended as "open" terms (e.g., the term "including" should be interpreted as "including, but not limited to"; the term "having" should be interpreted as "having at least"; the term "includes" should be interpreted as "includes, but is not limited to"). It will be further understood by those within the art that if a specific number of an introduced claim recitation is intended, such an intent will be explicitly recited in the claim, and in the absence of such recitation, no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general, such a construction is intended in the sense one having skill in the art would understand the convention (e.g., "a system having at least one of A, B, and C" would include, but not be limited to, systems that have A alone, B alone, C alone, A and B together, A and C together, B and C together, and/or A, B, and C together). In those instances where a convention analogous to "at least one of A, B, or C, etc." is used, in general, such a construction is intended in the sense one having skill in the art would understand the convention (e.g., "a system having at least one of A, B, or C" would include, but not be limited to, systems that have A alone, B alone, C alone, A and B together, A and C together, B and C together, and/or A, B, and C together). It will be further understood by those skilled in the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A," "B," or "A and B."

With respect to the appended claims, those skilled in the art will appreciate that recited operations therein may generally be performed in any order. Also, although various operational flow diagrams are presented in sequence(s), it should be understood that the various operations may be performed in other orders than those that are illustrated or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

It is worthy to note that any reference to "one aspect," "an aspect," "an exemplification," "one exemplification," and the like means that a particular feature, structure, or characteristic described in connection with the aspect is included in at least one aspect. Thus, appearances of the phrases "in one aspect," "in an aspect," "in an exemplification," and "in one exemplification" in various places throughout the specification are not necessarily all referring to the same aspect. Furthermore, the features, structures, or characteristics may be combined in any suitable manner in one or more aspects.

As used herein, the singular form of "a," "an," and "the" include the plural references unless the context clearly dictates otherwise.

Any patent application, patent, non-patent publication, or other disclosure material referred to in this specification and/or listed in any Application Data Sheet is incorporated by reference herein, to the extent that the incorporated material is not inconsistent herewith. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein, will only be incorporated to the extent that no conflict arises between that incorporated material and the existing disclosure material. None is admitted to be prior art.

In summary, numerous benefits have been described that result from employing the concepts described herein. The foregoing description of the one or more forms has been presented for purposes of illustration and description. It is not intended to be exhaustive or limiting to the precise form disclosed. Modifications or variations are possible in light of the above teachings. The one or more forms were chosen and described to illustrate principles and practical application to thereby enable one of ordinary skill in the art to utilize the various forms with various modifications as are suited to the particular use contemplated. It is intended that the claims submitted herewith define the overall scope.

What is claimed is:

1. A transaction card, comprising:
   card information;
   a card face with a selectively modifiable transparency, wherein the card face is selectively switchable between a first state characterized by a first transparency and a second state characterized by a second transparency less than the first transparency, and wherein the card information is visible in the first state and obscured in the second state; and
   an integrated circuit configured to transmit current to switch the card face between the second state and the first state, wherein the integrated circuit comprises a capacitor chargeable by an external power source, wherein the capacitor is configured to switch the card face between the first state and the second state upon discharging power stored in the capacitor in the absence of external power.

2. The transaction card of claim 1, wherein the card face is defined by:
   a card surface that includes the card information; and
   a material disposed on the card surface on the card information, wherein the material comprises the selectively modifiable transparency.

3. The transaction card of claim 2, wherein the material comprises polymer dispersed liquid crystals (PDLC), and wherein the PDLC comprise a voltage-dependent transmittance.

4. The transaction card of claim 2, wherein the material is configured to define:
   a first segment configured to selectively obscure a first portion of the card information; and
   a second segment configured to selectively obscure a second portion of the card information independent of the first segment.

5. The transaction card of claim 1, wherein the transaction card is a batteryless card.

6. The transaction card of claim 1, wherein the card face is switchable from the second state to the first state based on a threshold voltage.

7. The transaction card of claim 1, wherein the card face is selectively switchable between the first state and the second state based on an authentication associated with a wireless power source.

8. The transaction card of claim 7, wherein the authentication is with a server associated with the wireless power source.

9. The transaction card of claim 7, wherein the wireless power source is a user device, and wherein the authentication is with the user device.

10. The transaction card of claim 1, wherein the card face is defined by:
    a card surface that includes the card information; and
    an integrated circuit, comprising:
       a selectively transparent layer disposed on the card information; and
       a controller configured to permit, based on a successful authentication, current to pass through the selectively transparent layer to switch the selectively transparent layer between the first state and the second state.

11. A method for protecting card information on a card face of a transaction card, comprising: establishing, by a user device, a wireless connection with the transaction card; transmitting, by the user device, wireless power to the transaction card, wherein the wireless power is to charge a capacitor of the transaction card; receiving, by a user interface of the user device, a command to switch the card face of the transaction card between a second state and a first state to reveal or obscure card information, wherein the first and second states are characterized by different light transparencies; and based on the command, transmitting, by the user device, to the transaction card: authentication data; and instruction data to execute the command, wherein, in the absence of the wireless connection with the user device, the transaction card discharges power stored in the capacitor to switch the card face between the first state and the second state.

12. The method of claim 11, further comprising retrieving the authentication data from a server for transmission to the transaction card.

13. The method of claim 11, wherein the command is to switch the card face to the first state to show card information, and where the method further comprises:
    receiving a second command to switch the card face to the second state to obscure the card information; and
    transmitting, by the user device, to the transaction card, second instruction data to execute the second command.

14. A method for protecting card information on a card face of a transaction card, the method comprising:
    powering up an integrated circuit of the transaction card by energy from an external power source;
    charging a capacitor of the circuit of the transaction card by the energy from the external power source;

establishing, by the integrated circuit of the transaction card, a communication channel with the external power source;

receiving, by the transaction card, through the communication channel, authentication data, and instruction data from the external power source to switch the card face between a first state and a second state to reveal or obscure card information, wherein the first and second states are characterized by different light transparencies;

based on a successful authentication with the authentication data, switching, by the transaction card, the card face between a first state and a second state based on the instruction data; and discharging power stored in the capacitor to switch the card face between the first state and the second state in absence of the external power source.

15. The method of claim 14, comprising discharging power stored in the capacitor to switch the card face to the second state to obscure the card information based on a determined time.

* * * * *